US 6,707,934 B1

(12) United States Patent
Takeda et al.

(10) Patent No.: US 6,707,934 B1
(45) Date of Patent: Mar. 16, 2004

(54) APPARATUS AND METHOD FOR COLLATING IMAGE

(75) Inventors: Tsuneharu Takeda, Hamura (JP); Katsuhiko Satoh, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/468,633

(22) Filed: Dec. 22, 1999

(30) Foreign Application Priority Data

Dec. 28, 1998 (JP) ............................. 10-372205
Jun. 14, 1999 (JP) ............................. 11-166768

(51) Int. Cl.$^7$ ................................................. G06K 9/00
(52) U.S. Cl. ........................................ 382/124; 356/71
(58) Field of Search ................ 382/124, 125, 382/135, 205, 126, 127; 283/68, 69, 70; 356/71

(56) References Cited

U.S. PATENT DOCUMENTS

| | | | | |
|---|---|---|---|---|
| 4,135,147 A | * | 1/1979 | Riganati et al. | 382/125 |
| 4,581,760 A | | 4/1986 | Schiller et al. | |
| 5,067,162 A | * | 11/1991 | Driscoll. et al. | 382/126 |
| 5,943,442 A | * | 8/1999 | Tanaka et al. | 382/191 |
| 6,134,340 A | | 10/2000 | Hsu et al. | 382/124 |

FOREIGN PATENT DOCUMENTS

| | | |
|---|---|---|
| EP | 0 508 845 A | 10/1992 |
| JP | 63-41989 | 2/1988 |
| JP | 09-282458 | 10/1997 |
| JP | 11-250261 | 9/1999 |

OTHER PUBLICATIONS

J. Zhang et al: "Face Recognition: Eigenface, Elastic Matching, and Neural Nets", Proceedings of the IEEE, IEEE, New York, U. S. A., vol. 85, No. 9, Sep. 1, 1997, pp. 1423–1435, XP000738565, ISSN: 0018–9219; p. 1427, left–hand column, 3rd paragraph—right–hand column, penultimate paragraph*.

J. A. Ratkovic et al: "Concepts For A Next Generation Automated Fingerprint System", Proceedings of the Carnahan Conference on Crime Countermeasures, Kentucky, U.S.A., May 17–19, 1978; Proceedings of the International Carnahan Conference on Security Technology: Crime Countermeasures, IEEE, New York, U.S.A., May 17, 1978, pp. 157–161. XP000199727; *p. 159, left–hand column, paragraph 3—paragraph 6*; *p. 160, left–hand column, paragraph 2; figure 3*.

(List continued on next page.)

Primary Examiner—Leo Boudreau
Assistant Examiner—Shefali Patel
(74) Attorney, Agent, or Firm—Frishauf, Holtz, Goodman & Chick, P.C.

(57) ABSTRACT

An image collation apparatus has stored therein first image (registered fingerprint) beforehand. Regarding second image (fingerprint to be collated) that is input when collation is performed, the apparatus thereby determines the identicalness between this second image and the first image. At this time, the apparatus defines with respect to the first image a plurality of regions each having a predetermined positional relationship with respect thereto. The apparatus searches from the second image an image region having a maximum correlation with the image of each of the respective defined regions. The identicalness between the first image and the second image is determined according to the difference between the positional relationship of each of the respective image regions defined on the first image and the positional relationship of the maximum correlation region that comprises been searched out on the second image.

18 Claims, 11 Drawing Sheets

OTHER PUBLICATIONS

Yahagi Hironori et al: "Moving–Window Algorithm For Fast Fingerprint Verification", Technologies Today and Tomorrow, New Orleans, U.S.A., Apr. 1–4, 1990, Proceedings of the Southeast Conference (Southeastcon), New York, IEEE, U.S.A.; vol. 1, Apr. 1, 1990, p. 343–347, XP000203123; *p. 343, right–hand column, paragraph 4*; *p. 344, left–hand column, paragraph 2; figures 1, 2*.

Hironori Yahagi et al: "Moving–Window Algorithm For Fast Fingerprint Verification", Proceedings of the Southeast Conference (Southeastcon), U.S., New York, IEEE, vol. 1, Apr. 1, 1990. pp. 343–347, XP000203123—entire document.

S. Anderson: "A Single Chip Sensor & Image Processor For Fingerprint Verification", Proceeding of the Custom Integrated Circuits Conference, U.S., New York, Conf. 13, May 12, 1991, pp. 1211–1214, XP000295730, ISBN: 0–7803–0015–7, p. 12.1.3, left–hand column, paragraph 1.

* cited by examiner

REGISTERED FINGERPRINT "A"

FINGERPRINT "B" TO BE COLLATED

REGISTERED FINGERPRINT "A"

| | | |
|---|---|---|
| mt | $x_0$ | $y_0$ |
| | ... | |
| st1 | $x_1$ | $y_1$ |
| st2 | $x_2$ | $y_2$ |
| st3 | $x_3$ | $y_3$ |
| st4 | $x_4$ | $y_4$ |

FIG.6A

FINGERPRINT "B" TO BE COLLATED

| | | |
|---|---|---|
| MT | $X_0$ | $Y_0$ |
| | ... | |
| ST1 | $X_1$ | $Y_1$ |
| ST2 | $X_2$ | $Y_2$ |
| ST3 | $X_3$ | $Y_3$ |
| ST4 | $X_4$ | $Y_4$ |

FIG.6B

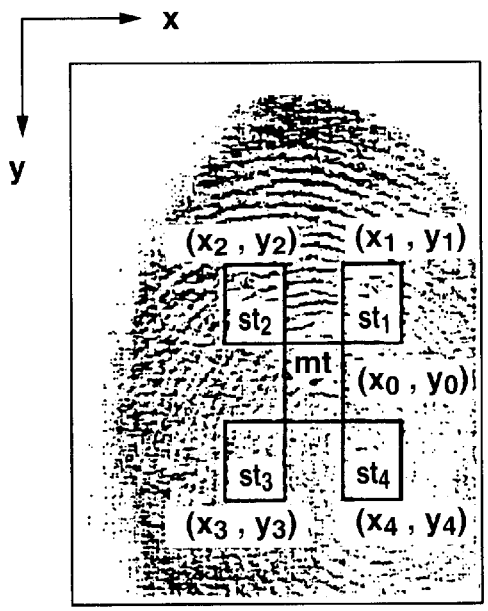
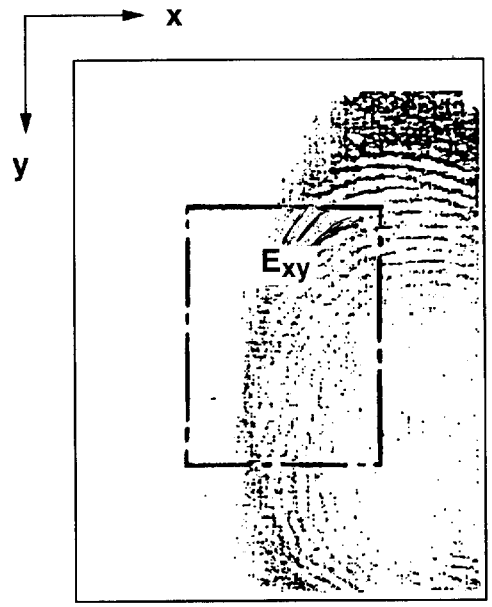
REGISTERED FINGERPRINT "A"
FIG.8A
FINGERPRINT "B" TO BE COLLATED
FIG.8B
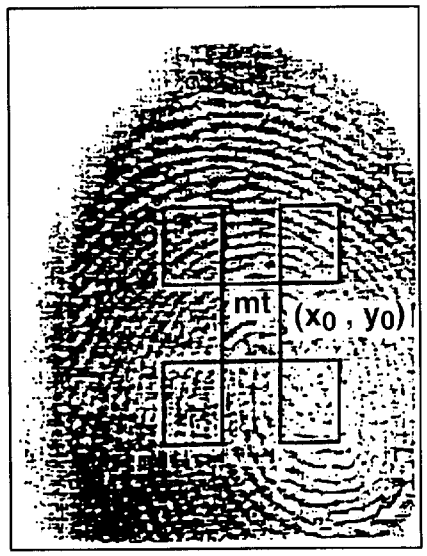
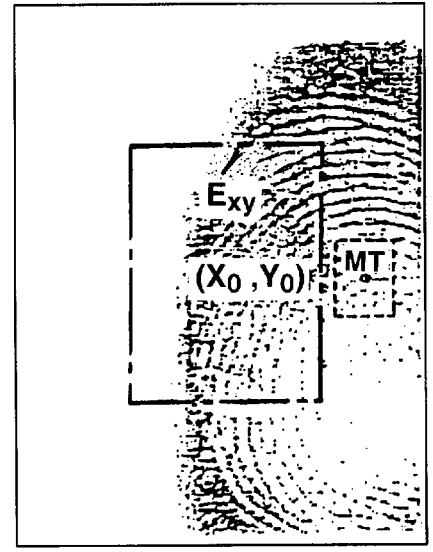
REGISTERED FINGERPRINT "A"
FIG.9A
FINGERPRINT "B" TO BE COLLATED
FIG.9B

REGISTERED
FINGERPRINT "A"

FINGERPRINT "B"
TO BE COLLATED

REGISTERED
FINGERPRINT "A"

FINGERPRINT "B"
TO BE COLLATED

APPARATUS AND METHOD FOR COLLATING IMAGE

BACKGROUND OF THE INVENTION

The present invention relates to a technique of collating image data, and more particularly to a technique of collating images, which is suitable for certifying the person himself and which collation is performed using finger print image data.

This application is based on Japanese Patent Applications No. 10-372205, filed Dec. 28, 1998 and No. 11-166768, filed Jun. 14, 1999, the entire contents of which are incorporated herein by reference.

Conventionally, in order to prevent illegal access to be had to secret information, the collation of the person himself is carried out through the input of a password, fingerprint, etc. Regarding a password, there is the likelihood of its being used by another's stealth, whereas a fingerprint is the characterizing feature of the body and so it is less likely that it is used by another's stealth. In view of this, the collation made by fingerprint has been being expected to have a high level of safety.

Conventional collation of the fingerprint was carried out in accordance with the following procedures. (1) obtain a fingerprint to be collated by an image reader as multi-gradation image data. (2) binarize the multi-gradation image data. (3) extract the characterizing points such as diverging points or ending points of the wrinkles constituting the fingerprint, from the binarized data. These characterizing points are called "characterizing figures" or "maneusha". (4) compare the positional relationship between the characterizing figures that have been extracted and the characterizing figures of the person's own fingerprint registered beforehand, and thereby determine the identicalness between the both.

However, in a case where the valley of the wrinkles of the subject's finger-skin is shallow, or where the skin is too soft, when at the time of input the subject applies his finger onto the glass surface of the image reader, it happens that the wrinkles are crushed. As a result, there is the possibility that unclear images will only be obtained and so the subject will not be able to be authenticated. Although the proportion of the persons having such finger-skin wrinkles is on the order of several percentages, this value is the one that is as great as the values that cannot be ignored when considering the actual circumstances that 0.1% is required as the percentage of a failure to collate a fingerprint such as rejecting the right person, erroneously admitting another as being the right person, etc.

Also, it happens that the person has his finger injured or cut. Even when the finger has been slightly injured, in a case where the place is near the characterizing features, it results that the person himself can not be recognized as being the right person.

In the above-described conventional fingerprint collation method, unless the fingerprint image data that is input has its fingerprint clearly imaged out, this data couldn't be accurately collated with the finger's original.

BRIEF SUMMARY OF THE INVENTION

Accordingly, it is an object of the present invention to provide an apparatus for and a method of collating image data, which make it possible to perform fingerprint collation, etc. without being affected by the characteristic of the finger skin, the presence of injuries, etc.

According to the present invention, there is provided an image collation apparatus for calculating identicalness between first image that is registered beforehand and second image that is input at a time of collation, comprising:

a define section which defines a plurality of regions in the first image;

a search section which searches out from the second image a region having a maximum correlation with each of the plurality of regions defined by the define section, as a maximum correlation region; and a calculate section which calculates the identicalness between the first image and the second image according to a difference between a positional relationship of each of the plurality of regions defined by the define section and a positional relationship of the maximum correlation region.

According to the present invention, there is provided a computer readable recording medium storing a computer program which calculates identicalness between first image that is registered beforehand and second image that is input at a time of collation, the computer program comprising:

a define program which defines a plurality of regions in the first image;

a search program which searches out from the second image a region having a maximum correlation with each of the plurality of regions defined by the define program, as a maximum correlation region; and a calculation program which calculates the identicalness between the first image and the second image according to a difference between a positional relationship of each of the plurality of regions defined by the define program and a positional relationship of the maximum correlation region.

According to the present invention, there is provided an image collation method of calculating identicalness between first image that is registered beforehand and second image that is input at a time of collation, comprising:

a definition step which defines a plurality of regions in the first image;

a search step which searches out from the second image a region having a maximum correlation with each of the plurality of regions defined by the definition step, as a maximum correlation region; and a calculation step which calculates the identicalness between the first image and the second image according to a difference between a positional relationship of each of the plurality of regions defined by the definition step and a positional relationship of the maximum correlation region.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 6A and 6B show a memory map of a RAM relating to the fingerprint collation processing;

FIGS. 8A and 8B illustrate fingerprint images that are used to explain the fingerprint collation processing;

FIGS. 9A and 9B illustrate fingerprint images that are used to explain the fingerprint collation processing;

DETAILED DESCRIPTION OF THE INVENTION

A preferred embodiment of an apparatus for and a method of collating image according to the present invention will now be described with reference to the accompanying drawings.

First Embodiment

Figure 1:
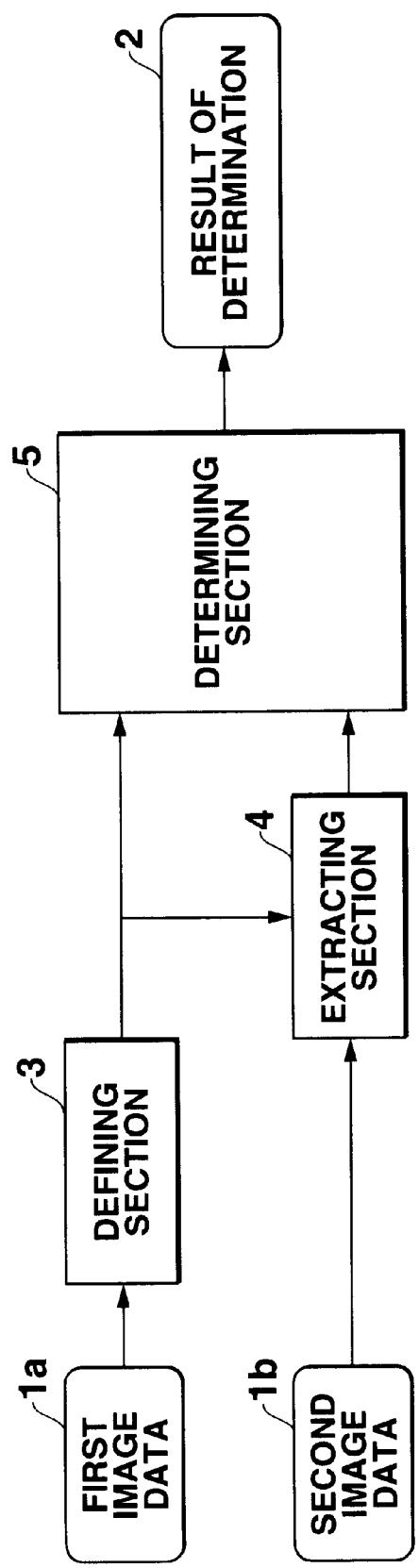
FIG. 1 is a block diagram illustrating the principle of the present invention.

FIG. 1 is a block diagram illustrating the principle of the present invention.

A first image data 1a is image data that is registered in a database beforehand. In a finger collation system, a registered fingerprint corresponds to this first image data.

A second image data 1b is image data that has been obtained using an image reader, etc. In a finger collation system, a fingerprint to be collated corresponds to this second image data.

A defining section 3 defines a plurality of regions over the first image data 1a. This defining of each region is performed by locating a template having a predetermined shape at a predetermined position on the image data. Each template may be of the same shape and size, or be of a different shape and size. Further, each template may be positioned in a state of its being partly overlapped upon another on the image.

An extracting section 4 serves to set an image region, with respect to the second image data, that has the same size and shape as those of a corresponding one of the respective templates that have been positioned on the first image by the defining section 3. It serves to move the image region that has been thus set. It thereby serves to find out on the second image a region having a maximum correlation with the first image data on which the corresponding template is positioned. The region that has been thus found out is called "a maximum correlation region".

A determining section 5 examines the positional relationship of the templates defined by the defining section 3 and the positional relationship of the maximum correlation regions found out by the extracting section 4. According to the extent by which the both positional relationships differ from each other, the determining section 5 determines the degree of identicalness, or the degree of similarity, between the first image and the second image data.

It is to be noted, regarding the image data, that even binarized data enables determination and that, however, multi-gradation image data is more preferable in order to make a perfect determination of the correlation. Further, it is also possible to set the first image as the fingerprint to be collated and set the second image as the registered fingerprint by interchanging the first image and the second image data with each other.

The above-described functions of the defining section 3, extracting section 4, and determining section 5 can be performed by a computer. An explanation will now be given of an embodiment in the form of a fingerprint collation apparatus that uses a computer. In this case, the fingerprint collation processing as later described is prepared as a program that is to be executed by the computer. Then this program is stored in a storage device of the computer and is executed by the central operation-processing unit.

Figure 2:
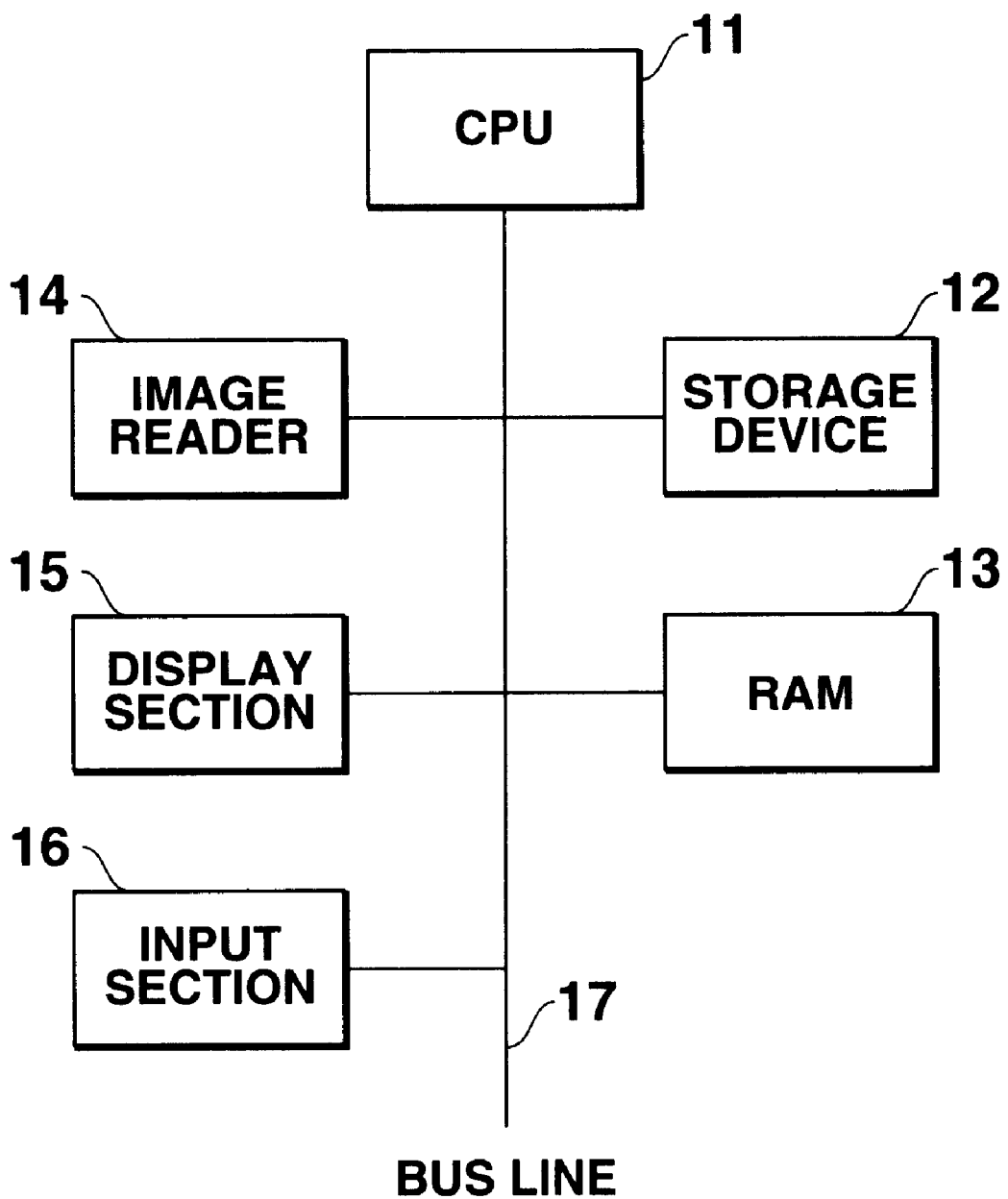
FIG. 2 is a block diagram illustrating the construction of an apparatus for collating a fingerprint according to a first embodiment of the present invention.

FIG. 2 is a block diagram illustrating the construction of the apparatus for collating a fingerprint according to the first embodiment of the present invention. This apparatus is constructed of a CPU 11, a storage device 12, a RAM 13, an image reader 14, a display section 15, and an input section 16, which are connected to one another via a bus line 17.

The CPU 11 is a central operation-processing unit, which, in accordance with a control program stored in the storage device 12, controls the entire operation of the fingerprint collation apparatus (hereinafter referred to merely as "the present apparatus") while using the RAM 13 as a work area. The CPU 11 performs the fingerprint collation processing as later described by executing the control program.

The storage device 12 is composed of a ROM, a hard disk, etc. The storage device 12 previously stores therein the above-described control program that is read out from the CPU 11 immediately after turning on a power source of the present apparatus. In addition, the storage device 12 also previously stores therein subject's registered fingerprint that corresponds to the first image data 1a illustrated in FIG. 1.

The RAM 13 is a work memory that the CPU 11 uses when executing the above-described control program.

The image reader 14 is a device for obtaining a subject fingerprint to be collated that corresponds to the second image data 1b illustrated in FIG. 1. The image reader 14 is, for example, an image scanner, or an image sensor such as a CCD (charge coupled device).

The display section 15 is a display device such as a CRT or a liquid crystal display, which makes a display of the determination result of the collation, which determination result corresponds to a determination result 2 illustrated in FIG. 1.

The input section 16 is an input device such as a keyboard device, by means of which a user of the present apparatus instructs the CPU 11 to obtain a fingerprint to be collated, or to start the fingerprint collation processing as later described.

Incidentally, in the present apparatus, the fingerprint collation program was stored in the storage device 12 beforehand as mentioned above. It can be also arranged that, from a storage medium having a fingerprint collation processing program stored therein, this fingerprint collation processing program be made to be read by a reading device equipped to a computer that corresponds to the storage medium. For example, this fingerprint collation-processing program is temporarily stored in a main memory, and the program is executed by the central processing unit.

Figure 3:
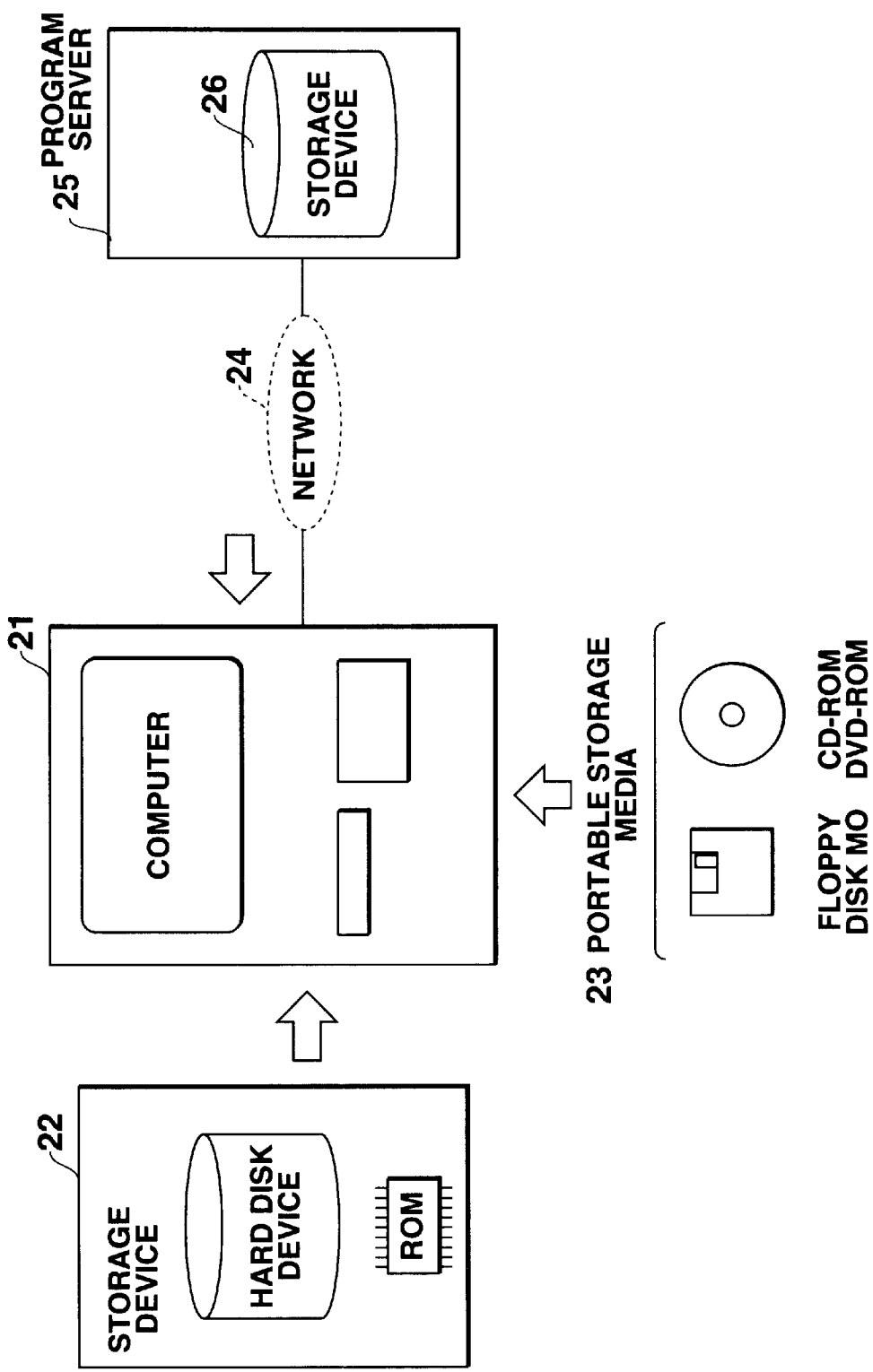
FIG. 3 is an illustration of recording media that stores therein a fingerprint collation processing program and that is readable by a computer.

In FIG. 3 illustration is made of an example of a computer-readable storage medium that stores therein the fingerprint collation-processing program. As illustrated in this figure, as the storage media, there can be used a storage device 22 such as a ROM or a hard disk device, which is equipped to a computer 21 as an accessory in a built-in form or in a form externally equipped thereto, portable storage media 23 such as a floppy disk, MO (magneto-optical disk), CD-ROM, or DVD-ROM, a storage device 26 that is an accessory to a program server that is a computer connected to the computer 21 via a network 24, etc.

Next, the control operation that is performed by the CPU 11 will be explained.

Figure 4:
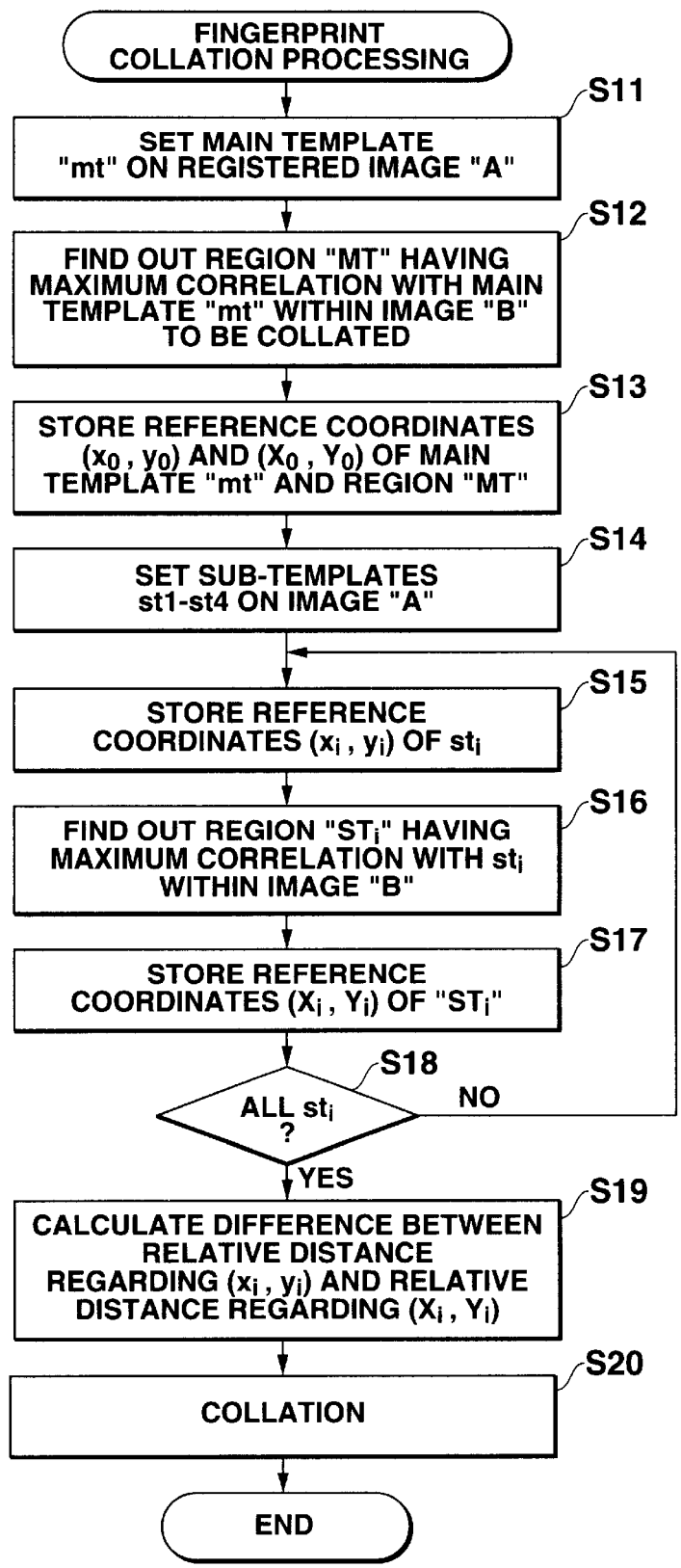
FIG. 4 is a flow chart illustrating the fingerprint collation processing according to the first embodiment of the present invention.

FIG. 4 is a flow chart that, of the control process of the present apparatus as a whole realized by the execution of the above-described control program by the CPU 11, illustrates the contents to be processed of a fingerprint collation processing having particular relevance to the present invention. In this figure, the contents of the pieces of processing performed in step S11 and step S14 correspond to the pieces of processing that are performed in the defining section 3 of FIG. 1. Also, the contents of the pieces of processing performed in steps S12, S13 and step S16 correspond to the pieces of processing that are performed in the extracting section 4. Further, the contents of the pieces of processing performed in steps S18 and step S19 correspond to the pieces of processing that are performed in the determining section 5.

Figure 5A:
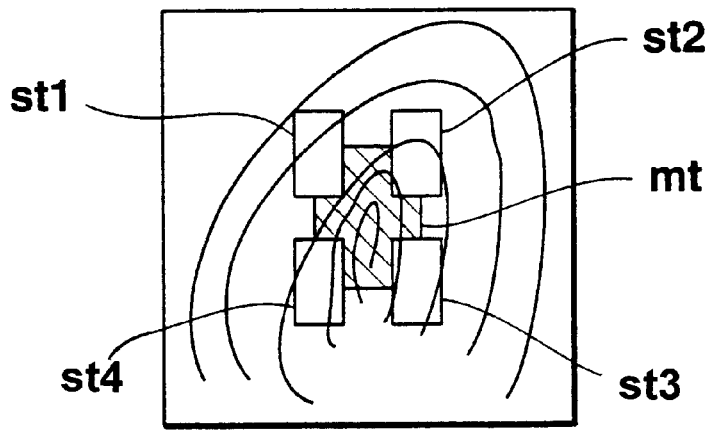
FIGS. 5A and 5B illustrate fingerprint images that are used to explain the fingerprint collation processing.
Figure 5B:
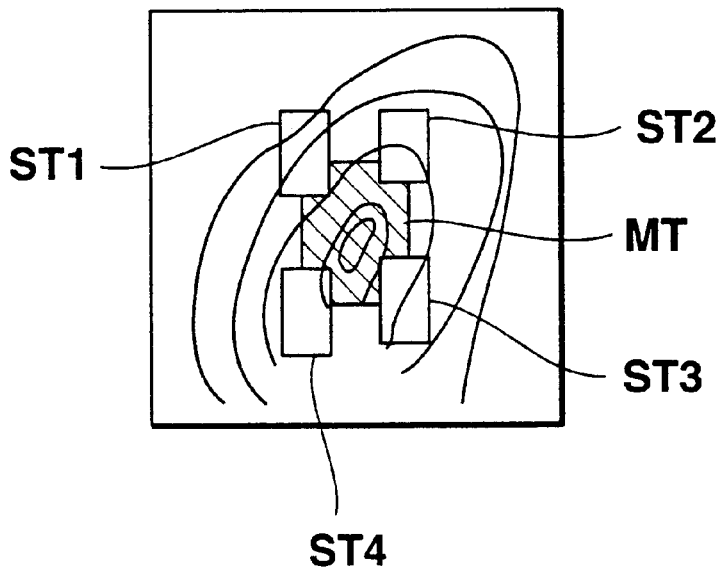

FIGS. 5A and 5B illustrate examples of the images of fingerprints used to explain the fingerprint collation processing. FIG. 5A illustrates a subject's registered fingerprint that is stored in the storage device 12 beforehand. FIG. 5B illustrates a subject's fingerprint to be collated, which has been sampled by the image reader 14. Also, it is assumed that each of the both images of these figures be a multi-gradation image.

FIGS. 6A and 6B show a memory map regarding the fingerprint collation processing, illustrating the state of use of the RAM 13, that prevail when the CPU 11 performs the fingerprint collation processing.

The fingerprint collation processing that is performed by the CPU 11 will hereinafter be explained along FIG. 4 while referring to FIGS. 5A, 5B, 6A and 6B.

When an instruction to start the fingerprint collation processing is made to the input section 16, first, a main template "mt" is positioned on a registered fingerprint image "A" as illustrated in FIG. 5A, in order to define a rectangular region over the image of the registered fingerprint (step S11). The size of this main template "mt" may be arbitrary so long as the required collation precision of a collation between fingerprints is obtained.

Next, a maximum correlation region MT that corresponds to the region indicated by the main template "mt" is searched from the fingerprint image "B" of the fingerprint to be collated. This searching operation is performed as follows. Setting is performed of a rectangular region having the same shape and size as those of the main template "mt" with respect to the image "B" of the collation fingerprint. Then, this rectangular region is two-dimensionally scanned in units of a pixel. Then, the correlation coefficient between the rectangular region and the region, which is indicated by the main template "mt", is calculated each time the movement is made. The rectangular region that is positioned where the correlation coefficient is maximum is set as being a maximum correlation region MT (step S12). The calculation of the correlation coefficient will be described later.

Here, determination is performed of the coordinates that serve as references for respectively particularizing the positions on the both images that respectively correspond to the main template "mt" and the rectangular region MT, e.g. the coordinates of the respective apexes at the left/upper corners of the both rectangles. These coordinates are set to be mt($x_0$, $y_0$) and MT($X_0$, $Y_0$), respectively. They are stored respectively in predetermined areas of the RAM 13 illustrated in FIGS. 6A and 6B (step S13).

Next, as illustrated in FIG. 5A, on the image "A" of the registered fingerprint are positioned sub-templates st1 to st4 so that the respective apexes of the square main template "mt" may be positioned at their centers, respectively, to thereby define corresponding rectangular regions (step S14). It is noted here that the position of the sub-templates can be arbitrarily made. Also, the number of the sub-templates is not limited to four, and this number may be arbitrary so long as the collation precision of a collation between the fingerprints is obtained as required. In addition, the size of the rectangular region that is defined here as mentioned above may be similarly arbitrary.

In the same way as in the case of extracting the rectangular region MT, regarding each (hereinafter referred to representatively as $st_i$ (the i=1, 2, 3, and 4)) of the sub-templates st1 to st4, a rectangular region having the same size as that of the sub-template $st_i$ is set on the image "B" of the collation fingerprint, as illustrated in FIG. 5B. Then, this rectangular region is two-dimensionally scanned in units of a pixel. Then, the correlation coefficient between this rectangular region and the region designated by the sub-template $st_i$ is calculated each time the movement is made. As a result, the rectangular region that is positioned where the correlation coefficient is maximum is set to be $ST_i$. Then, determination is performed of the respective coordinates that serve as references for respectively particularizing the positions on the images of the sub-template $st_i$ and the rectangular region $ST_i$, e.g. the respective coordinates of the apexes at the left/upper corners of the both rectangles. These coordinates are set to be $st_i(x_i, y_i)$ and $ST_i (X_i, Y_i)$. They are stored respectively in predetermined areas of the RAM 13 illustrated in FIGS. 6A and 6B (steps S15 to S17). It is to be noted that when searching a maximum correlation region corresponding to the sub-template $st_i$, using the position of the already particularized MT as a reference, prediction is done of the position where it is thought that the $ST_i$ will exist. Searching is thereby done of the position and its neighboring area. This sufficiently serves the purpose.

Thereafter, regarding the relative distance between the "mt" and the $st_i$ and the relative distance between the MT and the $ST_i$, the difference $\Delta_i$ between the both relative distances is calculated every value of the i (the i=1, 2, 3, and 4) in accordance with the following equation (step S19).

$$\Delta_i = |((x_i - x_0) - (X_i - X_0), (y_i - y_0) - (Y_i - Y_0))| \tag{1}$$

It is determined whether every calculated value of $\Delta_i$ falls under a predetermined value. If all the values fall under the predetermined value, it is determined that the registered fingerprint and the collation fingerprint coincide with each other. On the other hand, if otherwise, it is determined that the registered fingerprint and the collation fingerprint are out of coincidence. Whereby, the determination result is displayed on the display section 15 (steps S19 and S20). It is to be noted that the predetermined value, which is used here, is the one that is obtained, as a value enable to obtain a desired collation precision, by actually calculating the $\Delta_i$ values from the items of fingerprint image data that have been sampled from a plurality of persons, and in accordance with the distribution of these calculation results.

The foregoing processing is the fingerprint collation processing. It is to be noted that, although in the above-explained fingerprint collation processing the shape of the main template "mt" and sub-template $st_i$ has been made rectangular, the shape of these templates is not limited to a rectangular one. Namely, each of these templates may be of any given shape. Also, it is preferable that the size and shape of the "mt" and those of the MT as well as the size and shape of the $st_i$ and those of the $ST_i$ be the same to each other. However, even if there is a small difference between the two, such difference can be permitted so long as a required level of collation precision of one fingerprint with another is obtained.

Also, in the collation determination, in addition to the method of evaluating the $\Delta_i$ in the above-described processing, it is also possible to adopt various methods such as a determination that is performed based on the difference in shape or area between a figure, that is formed using, for example, the $st_i$ as an apex, and a figure, that is formed using the $ST_i$ as an apex.

Next, an explanation will now be given of the calculation of the coefficients of correlation that are used in the step S12 or step S16 of the fingerprint collation processing illustrated in FIG. 4. It is to be noted that the calculation of the coefficients of correlation between the rectangular region RA and the rectangular RB is explained here.

First, it is assumed that RA(i, j) and RB(m, n) respectively represent the pixels that are contained respectively in the rectangular region RA and the rectangular region RB, provided. It is also assumed that the sum totals of the pixels contained respectively in the rectangular region RA and the rectangular region RB be equal. Also, it is assumed that $X_{ij}$ and $Y_{mn}$ respectively represent signal intensities, each of which is the multi-gradation value indicating the thick and thin of a corresponding pixel.

When having generalized these signal intensities and expressed them as $Z_{pq}$, the following equation is defined.

$$<Z> = N^{-1} \Sigma Z_{pq} \qquad (2)$$

In the above equation, N represents the sum total of the pixels contained in the corresponding rectangular region. Also, in the above equation, $\Sigma$ represents the sum total of the signal intensities about all the pixels contained in the corresponding rectangular region. Namely, the above equation shows the average value of the signal intensities about the pixels contained in the corresponding region.

Next, the following equation is further defined.

$$<Z^2> = N^{-1} \Sigma Z_{pq}^2 \qquad (3)$$

The above equation shows the value of root mean square of the signal intensities about the pixels contained in the corresponding rectangular region.

Here, the correlation coefficient $C_{AB}$ between the rectangular region RA and the rectangular region RB can be calculated using the following equation that is expressed using the above-defined equations.

$$C_{AB} = <XY> - <X><Y> / ((<X^2> - <X>_2)(<Y^2> - <Y>^2))^{1/2} \qquad (4)$$

where $<XY> = (1/N)(\Sigma X_{ij} Y_{mn})$

Calculation is performed of the correlation coefficient between the regions by the use of the above equation.

It is to be noted that in the calculation of the correlation coefficient using the above equation, instead of calculating it using the signal intensities of all pixels within the rectangular region, for example, the following calculation may be performed. Namely, calculation that is performed using only the pixels arrayed on the line constituting any one row within the rectangular region, calculation that is performed using only the pixels contained in part of the rectangular region, or calculation that is performed using the pixels that have been selected by arbitrarily thinning from within the rectangular region may be performed. Even when these calculations are performed, there are no problems if a required level of collation precision of one fingerprint with another is obtained. Using these procedures of calculation, the number of pixels used as an object with respect to which the correlation coefficient is calculated is reduced. As a result of this, the amount of calculation is reduced. Therefore, such procedures of calculation are useful. Also, other methods of calculation of the correlation coefficients may be adopted for the above-described fingerprint collation processing.

Other embodiments of an apparatus for and a method of collating image according to the present invention will be described. The same portions as those of the first embodiment will be indicated in the same reference numerals and their detailed description will be omitted.

Second Embodiment

In the fingerprint collation, a subject is made to put his finger on a fingerprint reader of the fingerprint collation apparatus and to have his fingerprint to be collated read out by this fingerprint reader. At this time, when the position at which the subject has put his finger gets out of the proper position, this inconveniently causes an erroneous determination result to be produced.

On this account, a method of collation, which, even when at the time of sampling a collation fingerprint the subject's finger somewhat gets out of the proper position, enables the correct collation to be made, will now be explained as a second embodiment.

In this embodiment, it is assumed that the main template and the sub-template be both rectangular in shape and the same in size, and that the sub-templates each be positioned so as to contact with their corresponding apex of the main template.

Since the construction of the system is the same as that in the first embodiment, an explanation thereof is omitted. The processing operation will hereinafter be explained using FIGS. 7 to 13.

When an instruction to start the fingerprint collation processing is made to the input section 16, first, in step S101, the main template "mt" representing a rectangular region is positioned on the registered fingerprint image "A", as illustrated in FIG. 8A. The size and the shape of this main template "mt" may be arbitrary so long as a required level of collation precision of one fingerprint with another is obtained. It is assumed now that ($x_0$, $y_0$) represents the coordinates for particularizing the position on the registered image "A" of the main template "mt" that has been defined here as mentioned above, here the coordinates of the center of gravity of the main template "mt" that is rectangular.

Subsequently, in step S102, as illustrated in FIG. 8A, on the registered image "A" are positioned the sub-templates $st_i$ ($i \geq 1$) that define a plurality of rectangular regions that are different from that which is defined by the main template "mt". In an example illustrated in FIG. 8A, it is set that i=4. The sub-templates $st_1$ to $st_4$ that are four rectangles are defined in the positional relationship illustrated in FIG. 8A in such a way as to surround the main template "Mt". The size and the shape of these sub-template $st_i$ also may be arbitrary so long as a required level of collation precision of one fingerprint with another is obtained. It is assumed now that ($x_i$, $y_i$) represents the coordinates for particularizing the position on the registered image "A" of the sub-template $st_i$ that has been defined here as mentioned above, here the coordinates of the center of gravity of the sub-template $st_i$ that is rectangular.

Next, in step S103, a rectangular region that has the same shape and size as those of the main template "mt" is set on the fingerprint image "B" to be collated. While this rectangular region is being scanned over this image "B", calculation is performed of the correlation coefficient between this rectangular region and the region on the image "A" designated by the main template "mt", one after another.

In step S104, as a result of the successive calculation of the correlation coefficient, determination is made of the above-described rectangular region, regarding which the correlation coefficient between itself and the main template "mt" is maximum. This rectangular region is set as a region MT. The coordinates for particularizing the position on the image "B" of this region MT, which are the coordinates of the region MT corresponding to the coordinates ($x_0$, $y_0$) of the main template "mt", are represented as ($X_0$, $Y_0$).

Subsequently, in step S105, it is determined whether the region MT belongs to an effective region E that is set on the image "B". Concretely, it is determined whether the coordinates ($X_0$, $Y_0$) for particularizing the position of the region MT are included within an range $E_{x,y}$ that represents the effective region E. If this determination result is Yes, the flow proceeds to step S107 while if it is No the flow proceeds to step S106.

Here, the "effective region E" represents the range on the image "B", wherein the region MT can exist, and within which it is possible to obtain a maximum correlation region corresponding to the sub-template $st_i$, necessary for collation. In this embodiment, the range $E_{x,y}$ that is expressed by the following equation is set on the image "B".

$$E_{x,y} = \{(x,y) | \alpha_x \leq x \leq \beta_x, \alpha_y \leq x \beta_y\} \quad (5)$$

where $\alpha_x$=MAX[($x_0-x_2$)+$W_2$/2+$x_2$SEARCH, ($x_0-x_3$)+$W_3$/2+$x_3$SEARCH]

$\beta_x$=WIDTH−MAX[($x_1-x_0$)+$W_1$/2+$x_1$SEARCH, ($x_4-x_0$)+$W_4$/2+$x_4$SEARCH]

$\alpha_y$=MAX[($y_0-y_1$)+$H_1$/2+$y_1$SEARCH, ($y_0-y_2$)+$H_2$/2+$y_2$SEARCH]

$\beta_y$=HEIGHT−MAX[($y_3-y_0$)+$H_3$/2+$y_3$SEARCH, ($y_4-y_0$)+$H_4$/2+$y_4$SEARCH]

FIG. 8B illustrates a state where, in a case where having defined the main template "mt" and the sub-template $st_i$ on the registered image "A" as illustrated in FIG. 8A, the range $E_{x,y}$ of the effective region E is set on the image "B". It is to be noted that in the above equation the $W_i$ and the $H_i$ represent the width (the length as viewed in the x direction) and the height (the length as viewed in the y direction) of the sub-template $st_i$. The WIDTH and the HEIGHT respectively represent the width (the length as viewed in the x direction) and the height (the length as viewed in the y direction) of each of the image "A" and the image "B" having the same size. Also, the $x_i$ SEARCH and the $y_i$SEARCH represent the ranges for searching on the image "B" the maximum correlation region corresponding to the sub-template $st_i$ positioned on the image "A". For each of them, for example, a value that corresponds to four to six pixels or so as taken in units of a pixel of the image data is used. Also, the MAX[p, q] represents the function for obtaining a larger one of the p and the q value (that in a case where the both are equal is either one of them).

Figure 12:
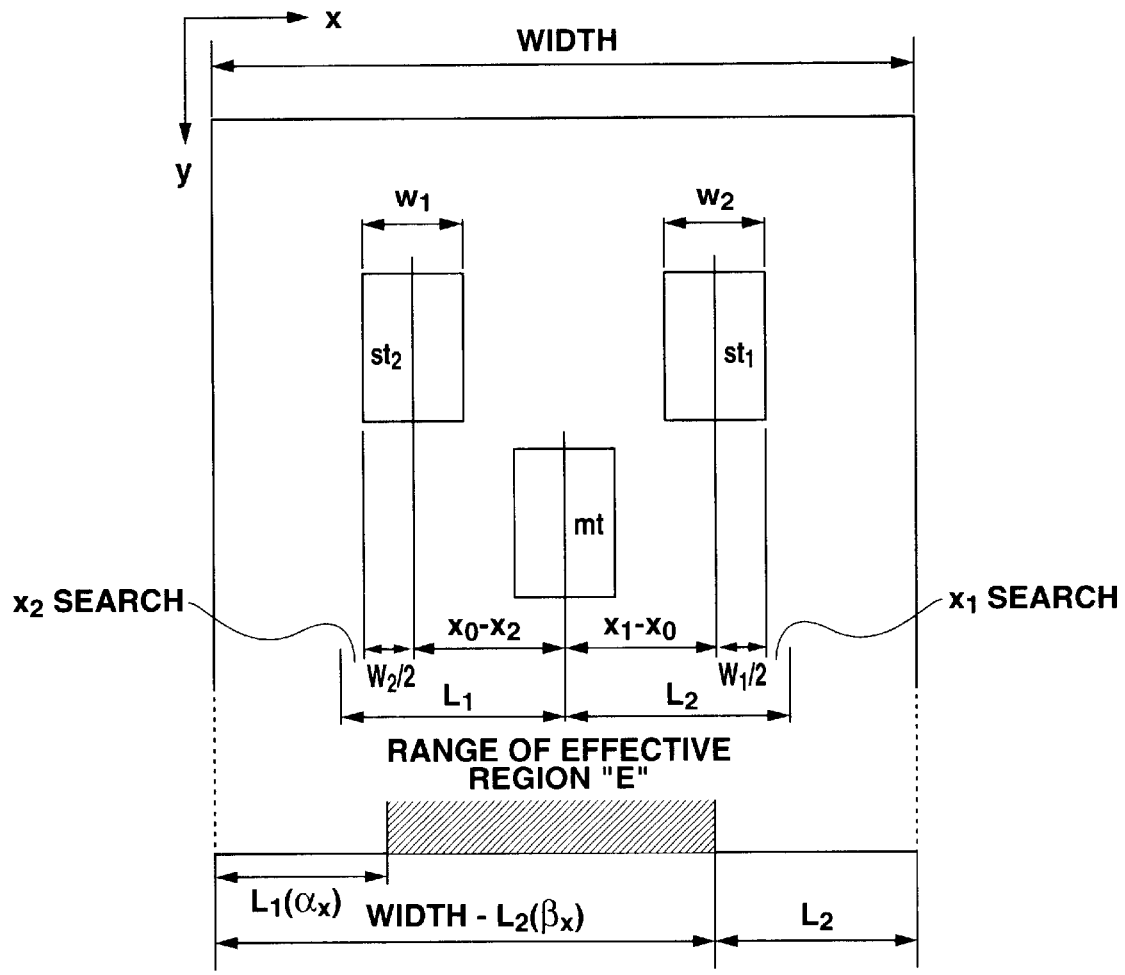
FIG. 12 is a view that is used to explain a procedure of setting an effective region.

A further explanation is given of the above equation. FIG. 12 is a view illustrating the procedure of setting the effective region E. FIG. 12 is given for the purpose of explaining the $\alpha_x$ and the $\beta_x$ of the above equation (4), and illustrates only the upper side portion of the image "A". It is to be noted that for brevity of explanation it is assumed that the sub-templates $st_3$ and $st_4$ be left out of consideration.

If referring to the above equation (4) and FIG. 12, it will be easily understood that $\alpha_x = L_1$, and $\beta_x$=WIDTH−$L_2$. By setting the effective region E as viewed in the x direction by using the values of the $\alpha_x$ and the $\beta_x$ that are determined from the above equation, it is possible to say as follows. In a case where the sub-templates $st_1$ and $st_2$ each were defined in such a way as to be positioned being widened in the x direction, the range of the effective region E, i.e. the range within which the region MT can exist in the case where the above-described positional relationship is maintained as is, is narrowed. On the other hand, in a case where the sub-templates $st_1$ and $st_2$ each were defined in such a way as to be positioned with a small width in the x direction, the range of the effective region E is widened.

Turning back to the explanation of FIG. 7, reference will now be made to the above-described step S105. If in this step S105 it has been determined that the region MT falls out of the effective region E, namely if as in the relationship between FIG. 9A and FIG. 9B the region MT on the image "B" corresponding to the main template "mt" on the registered image "A" falls outside the range Ex y of the effective region E, the following procedure is taken. Namely, in step S106, the sub-template $st_i$ is positioned on the registered image "A" again after correcting the position thereof. The re-positioning of the sub-template $st_i$ is performed in accordance with the procedure illustrated in FIG. 13.

Figure 13:
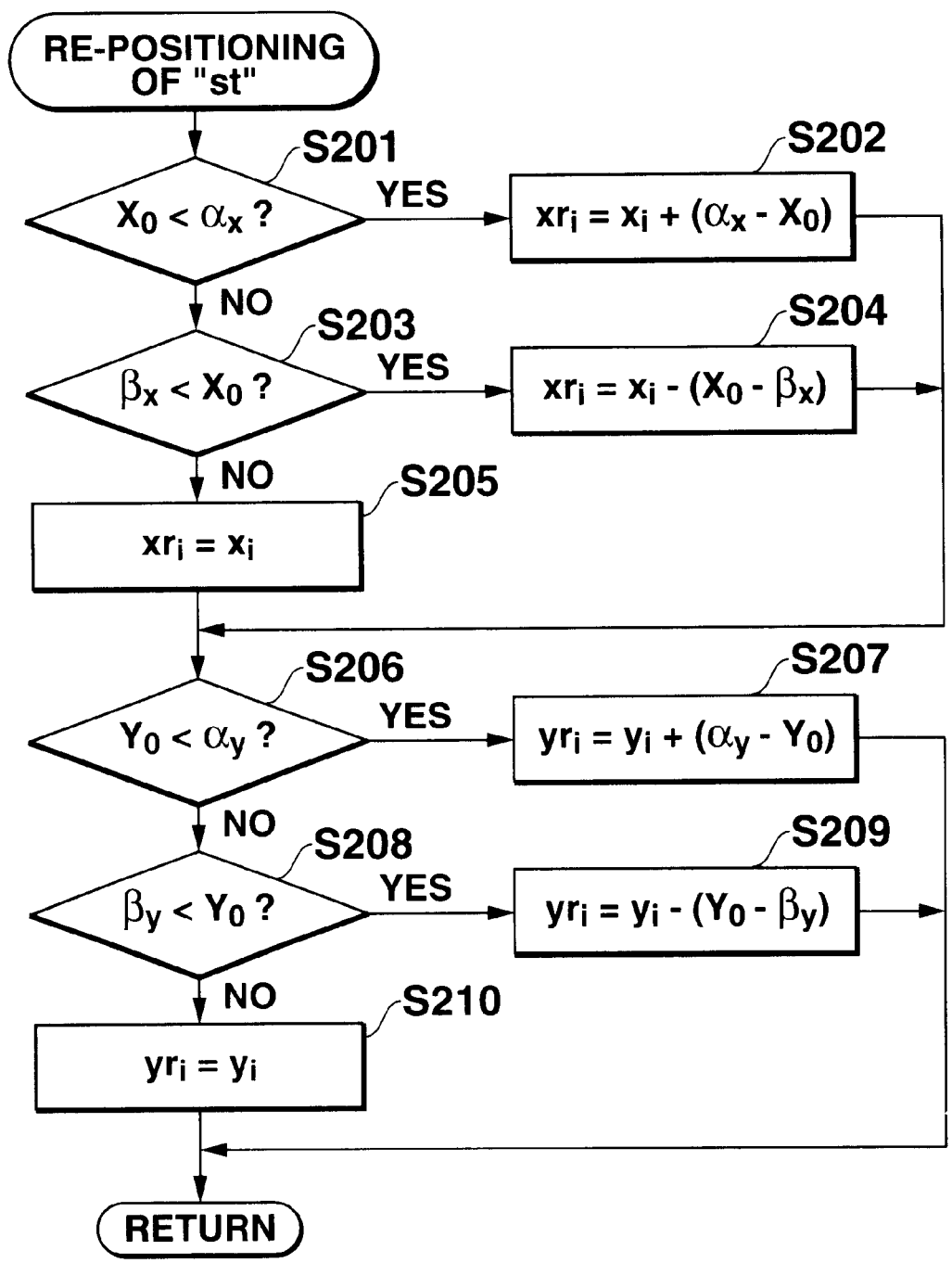
FIG. 13 is a flow chart illustrating the resetting processing of a sub-template.

FIG. 13 is a flow chart illustrating the contents to be processed of a re-positioning processing for re-positioning the sub-template. This re-positioning processing is the processing for re-locating the sub-template $st_i$ whose position is particularized by the coordinates ($x_i$, $y_i$) to a position that is particularized by the coordinates ($xr_i$, $yr_i$).

An explanation will now be given of this procedure.

First, regarding the x direction, it is determined whether the region MT falls within the range of the effective region E (step S201 and step S203).

As a result of the determination, if the x coordinate Xo for particularizing the position of the region MT is smaller than the $\alpha_x$ that represents the range as viewed in the x direction of the effective region E, since the fingerprint "B" to be collated is excessively displaced to the left, the x coordinate for particularizing the position of the sub-template $st_i$ is set to be $xr_i = x_i + (\alpha_x - X_0)$ and is moved rightwards (step S202). If the x coordinate $X_0$ is larger than the $\beta_x$ that represents the range as viewed in the x direction of the effective region E, since the fingerprint "B" to be collated is excessively displaced to the right, the x coordinate for particularizing the position of the sub-template $st_i$ is set to be $xr_i = x_i - (Xo - \beta_x)$ and is moved leftwards (step S204).

Here, in a case where the result of determination is outside the both cases, namely if the value of Xo is larger than the ax and smaller than the $\beta_x$, it is set that $xr_i=x_i$, namely the position of the sub-template $st_i$ is maintained to be as is at the original value. Then, the flow proceeds to step S206.

Subsequently, regarding the y direction, it is similarly determined whether the region MT falls within the range of the effective region E (step S206 and step S208).

The processing performed according to this result of determination is the same as the above-described processing that was performed regarding the x direction. If the y coordinate Yo for particularizing the position of the region MT is smaller than the $\alpha_y$ that represents the range as viewed in the y direction of the effective region E, the y coordinate for particularizing the position of the sub-template $st_i$ that is after re-positioning thereof is set to be $yr_i=y_i+(\alpha_y-Y_0)$ (step S207). And if the y coordinate Yo is larger than the $\beta_y$ that represents the range as viewed in the y direction of the effective region E, it is set that $yr_i=y_i-(Y_0-\beta_y)$ (step S209). In a case where the result of determination is outside the both cases, namely if the value of $Y_0$ is larger than the $\alpha_y$ and smaller than the $\beta_y$, it is set that $yr_i=y_i$, namely the position of the sub-template $st_i$ is maintained to be as is at the original value (step S210).

Figure 10A:
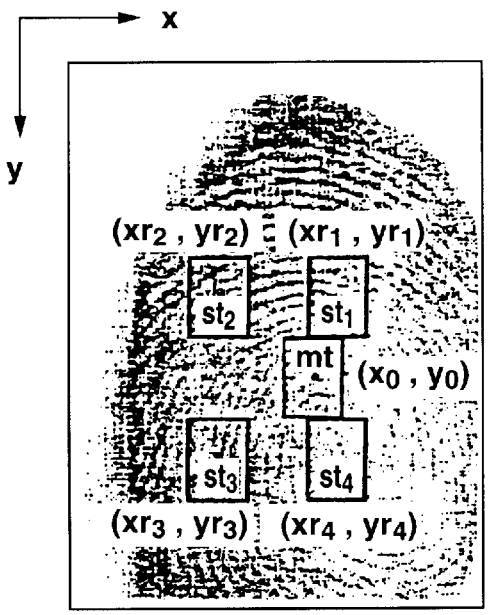
FIGS. 10A and 10B illustrate fingerprint images that are used to explain the fingerprint collation processing.
Figure 10B:
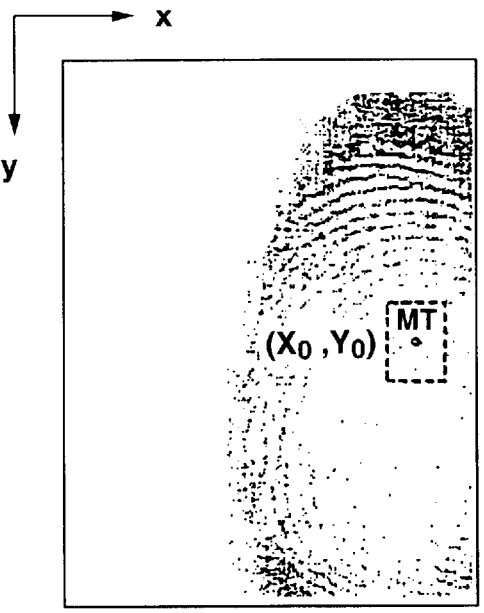

In accordance with the above-described procedure, re-positioning is performed of all the sub-templates $st_i$ that were previously defined on the registered image "A". FIG. 10A illustrates the result of re-positioning that has been performed in a case where the region MT on the image "B" fell out of the range $E_{x,y}$ of the effective region E to the right as illustrated in FIG. 9B. Namely, FIG. 10A illustrates the result wherein, in the case, the sub-templates $st_1$ to $st_4$ previously defined as illustrated in FIG. 8A have been moved leftwards and thus re-positioned. Also, FIG. 10B illustrates the region MT corresponding to the main template "mt" in FIG. 10A. Since in this case the position of the main template "mt" is not moved, the position of the region MT is not moved from the position illustrated in FIG. 9B.

Figure 7:
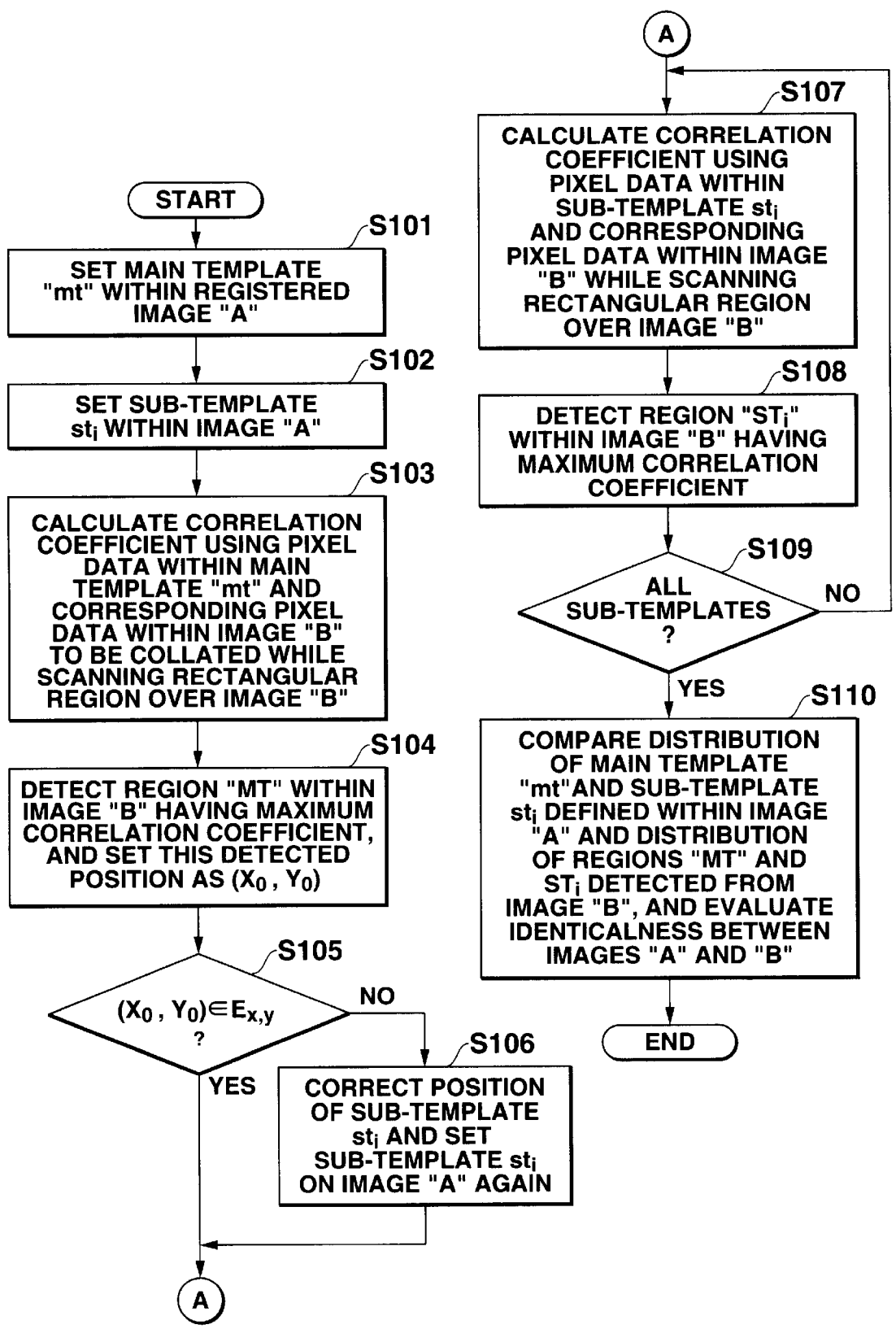
FIG. 7 is a flow chart showing the fingerprint collation processing according to a second embodiment of the present invention.

Turn is made back to the explanation of FIG. 7. When the result of the determination processing in step S105 is Yes, namely when the re-positioning of the sub-template $st_i$ is unnecessary, or after the repositioning of the sub-template $st_i$ has been performed through the processing in step S106, the following successive calculations are performed in step S107. Namely, in step S107, a rectangular region that is the same in shape and in size as the sub-template $st_i$ is set on the image "B". While scanning this rectangular region over this image "B", the correlation coefficient between this region and the sub-template $st_i$ is calculated one after another. Although the method of calculation of the correlation coefficient uses here the one that was used in the previously stated step S103, other methods of calculation thereof may be adopted.

In step S108, as a result of the successive calculations of the correlation coefficients, the rectangular region, regarding which the correlation coefficient between itself and the sub-template $st_i$ has become maximum, is determined. This rectangular region is set to be a region $ST_i$.

Figure 11A:
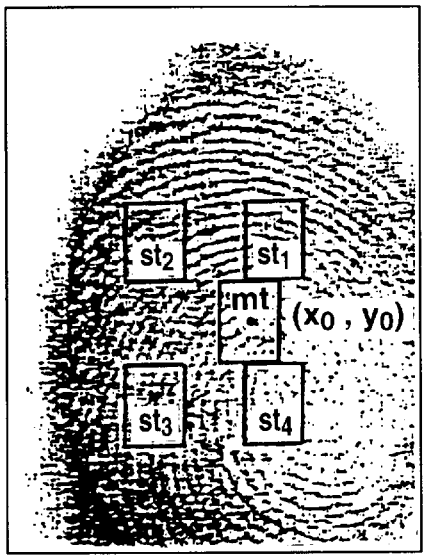
FIGS. 11A and 11B illustrate fingerprint images that are used to explain the fingerprint collation processing.
Figure 11B:
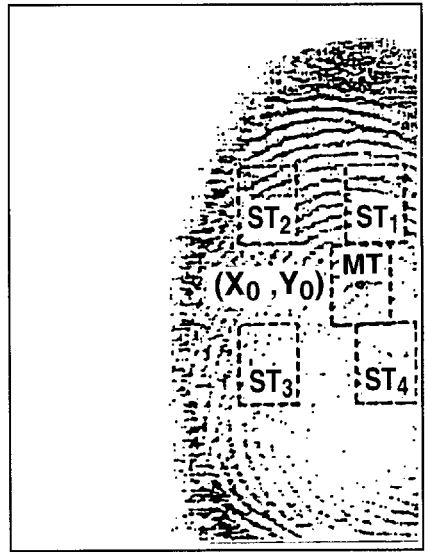

Subsequently, in step S109, it is determined whether the region $ST_i$ has finished being detected with regard to all the sub-templates $st_i$. If the determination result is Yes, the flow proceeds to step S110. On the other hand, if the determination result is No, the flow returns to step S107, in that the above-described processing for determining the region $ST_i$ is repeatedly performed. FIGS. 11A and 11B illustrate, regarding all of the re-positioned sub-templates $st_1$ to $st_4$, the results of the corresponding regions $ST_1$ to $ST_4$ that have been obtained, together with the main template "mt" and its corresponding region MT.

In step S110, the distribution of the positions of the main template "mt" and the sub-template $st_i$ in the image data "A" is compared with the distribution of the positions of the region MT and the region $ST_i$ in the image data "B". By this comparison is evaluated the identicalness between the image "AA" (the registered fingerprint) and the image "B" (the fingerprint to be collated). The evaluation on the identicalness that is executed in this step is substantially the same as the processing that is performed in step S19 of FIG. 4 and that was explained as the first embodiment. It is to be noted that, when evaluating the identicalness, it is possible to exclude the main template "mt" and the region MT from the objects to be evaluated. It is also possible, with this exclusion, to perform evaluation through only the comparison of the distribution of the positions of the sub-template $st_i$ and the distribution of the positions of the region $ST_i$.

The fingerprint collation processing that has up to here been explained is executed through the operation of the CPU 11, and the collation of the fingerprints is thereby performed in the present apparatus.

Additionally, although in the above-described embodiments of the present invention each of the main template "mt", sub-template $st_i$, region MT, and region $ST_i$ has been made to be of a rectangular shape, the shape of these templates and regions is not limited to being rectangular. The shape may be any desired one. Also, it is preferable that the size and shape of the main template "mt" and those of the region MT be the same and the size and shape of the sub-template $st_i$ and those of the region $ST_i$ be the same. However, even when some difference more or less exists between the both, such difference is permitted so long as a required level of collation precision of one fingerprint with another is obtained.

Also, the relationship of position of the main template "mt" relative to the sub-template $st_i$ or vice versa, the both templates being defined beforehand, has been determined, in each of the above-described embodiments of the present invention, as follows. Namely, the both templates have been positioned in such a positional relationship wherein the main template "mt" and the sub-template $st_i$ contact with each other as illustrated in FIG. 8A. However, the both templates may also be positioned and thereby defined in such a positional relationship wherein the two partially overlap one upon the other, or in such a positional relationship wherein the two are completely separated from each other.

Further, in the sub-template re-positioning processing, which is executed in a case where the region MT falls out of the effective region E and whose contents to be processed are illustrated in FIG. 13, each of the sub-templates $st_i$ has been re-positioned by being moved by the same distance. However, considering in which direction of the upper, lower, leftward, and rightward directions on the image "B" within the effective region E the region MT has gotten out of this effective region E, it may be also arranged to make different the movement distance of one sub-template $st_i$ from the original position thereof to the re-positioning thereof from the movement distance of another in correspondence with that direction. A concrete explanation will now be given of a case where determining the coordinates $(xr_i, yr_i)$ for particularizing the position, after re-positioning, of every one of the sub-templates $st_1$ to $st_4$ that were defined as illustrated in FIG. 8A, by way of example.

First, regarding the x coordinates, the $xr_i$ is determined from the relationship of the x coordinate $X_0$ for particularizing the position of the region MT with the above-described $\alpha_x$ and the $\beta_x$ that represent the range in the x direction of the effective region E, as follows.

When $X_0 < \alpha_x$ $$xr_i = x_i + (\alpha_x - X_0) \quad (i=2,3)$$

$$xr_i = x_i + (\alpha_x - X_0) \times u \quad (i=1,4)$$

where u represents a constant that is in the range of $0 \leq u < 1$.

When $\alpha_x \leq X_0 \leq \beta_x$ $$xr_i = x_i$$

When $\beta_x < X_0$ $$xr_i = x_i - (X_0 - \beta_x) \quad (i=1,4)$$

$$xr_i = x_i - (X_0 - \beta_x) \times u \quad (i=2,3)$$

where u represents a constant that is in the range of $0 \leq u < 1$.

Next, regarding the y coordinates, the $yr_i$ is determined from the relationship of the x coordinate Yo for particularizing the position of the region MT with the above-described $\alpha_y$ and the $\beta_y$ that represent the range in the y direction of the effective region E, as follows.

When $Y_0 < \alpha_y$ $$yr_i = y_i + (\alpha_y - y_0) \quad (i=1,2)$$

$$yr_i = y_i + (\alpha_y - y_0) \times v \quad (i=3,4)$$

where v represents a constant that is in the range of $0 \leq v < 1$.

When $\alpha_y \leq Y_0 \leq \beta_y$ $$yr_i = y_i$$

When $\beta_y \leq Y_0$ $$yr_i = y_i - (Y_0 - \beta_y) \quad (i=3,4)$$

$$yr_i = y_i - (Y_0 - \beta_y) \times v \quad (i=1,2)$$

where v represents a constant that is in the range of $0 \leq v < 1$.

Additionally, in a case where performing the re-positioning of the sub-template in accordance with the above equations, particularly if the re-positioning is performed under the conditions of u=v=0, the following merit will be obtained. Namely, if so, even when the region MT is outside the effective region E, it becomes possible, according to the positional relationship of the both regions, to perform the fingerprint collation without re-locating part of the sub-templates. Namely, it becomes possible to do so with those sub-templates being kept as were when they were initially defined. In such a case, the period of time that is required for the re-positioning processing of the sub-template is shortened, with the result that it is possible to shorten the processing time period needed for the fingerprint collation processing.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image collating method for determining identity between a first image and a second image with each other, the method comprising:
    defining a rectangular reference region in the first image as a template;
    searching for a maximum correlation region in the second image that has a maximum correlation with the rectangular reference region;
    defining rectangular sub-regions located at four corners of the rectangular reference region as sub-templates;
    searching for maximum correlation sub-regions in the second image that have maximum correlations with the rectangular sub-regions in the first image; and
    determining identity between the first and second images based on a difference between a positional relationship between the rectangular sub-regions in the first image and a positional relationship between the maximum correlation sub-regions in the second image.

2. The image collating method according to claim 1, wherein the rectangular sub-regions in the first image and the rectangular reference region contact at corners.

3. The image collating method according to claim 1, wherein the rectangular sub-regions in the first image and the rectangular reference region overlap.

4. The image collating method according to claim 1, wherein the rectangular sub-regions in the first image and the rectangular reference region are spaced from each other.

5. The image collating method according to claim 1, further comprising:
    detecting whether the maximum correlation regions searched by the maximum correlation region searching are in a predetermined relationship to the second image; and
    re-defining at least one of the rectangular sub-regions when it is detected that at least one of the maximum correlation regions is in the predetermined relationship to the second image.

6. The image collating method according to claim 5, wherein:
    the detecting includes detecting whether any of the maximum correlation regions are displaced from the second image by an amount that is larger than a predetermined amount; and
    the re-defining includes moving at least one of the rectangular sub-regions in accordance with a detected displacement amount.

7. The image collating method according to claim 1, wherein the first image is a reference fingerprint image which is registered, and the second image is a fingerprint image which is to be collated with the reference fingerprint image.

8. The image collating method according to claim 1, wherein the maximum correlation region searching comprises:
    setting, in the second image, a corresponding region of the rectangular reference region; and
    calculating a correlation between the rectangular reference region and the corresponding region while moving the corresponding region.

9. An image collating apparatus for determining identity between a first image and a second image with each other, the apparatus comprising:
    a reference region defining section configured to define a rectangular reference region in the first image as a template;

a maximum correlation region search section configured to search for a maximum correlation region in the second image that has a maximum correlation with the rectangular reference region;

a sub-region defining section configured to define rectangular sub-regions located at four corners of the rectangular reference region as sub-templates;

a maximum correlation sub-region search section configured to search for maximum correlation sub-regions in the second image that have maximum correlations with the rectangular sub-regions in the first image; and a determining section configured to determine identity between the first and second images based on a difference between a positional relationship between the rectangular sub-regions in the first image and a positional relationship between the maximum correlation sub-regions in the second image.

10. The image collating apparatus according to claim 9, further comprising:

a detector configured to detect whether the maximum correlation regions searched by the maximum correlation region search section are in a predetermined relationship to the second image; and a re-defining section configured to re-define at least one of the rectangular sub-regions that have been defined by the sub-region defining section when the detector detects that at least one of the maximum correlation regions is in the predetermined relationship to the second image.

11. The image collating apparatus according to claim 10, wherein:

the detector includes a section configured to detect the maximum correlation regions are displaced from the second image by an amount that is larger than a predetermined amount; and the re-defining section includes a section configured to move at least one of the rectangular sub-regions in accordance with a detected displacement amount.

12. The image collating apparatus according to claim 9, wherein the first image is a reference fingerprint image which is registered, and the second image is a fingerprint image which is to be collated with the reference fingerprint image.

13. The image collating apparatus according to claim 9, wherein the maximum correlation region search section comprises:

a section configured to set, in the second image, a corresponding region of the rectangular reference region; and a section configured to calculate a correlation between the rectangular reference region and the corresponding region while moving the corresponding region.

14. An article of manufacture comprising a computer usable medium having an image collating program for determining identity between a first image and a second image with each other, the program comprising:

computer readable program code means for causing a computer to search for a maximum correlation region in the second image that has a maximum correlation with a rectangular reference region defined in the first image as a template;

computer readable program code means for causing a computer to define rectangular sub-regions located at four corners of the rectangular reference region as sub-templates;

computer readable program code means for causing a computer to search for maximum correlation sub-regions in the second image that have maximum correlations with the rectangular sub-regions in the first image; and computer readable program code means for causing a computer to determine identity between the first and second images based on a difference between a positional relationship between the rectangular sub-regions in the first image and a positional relationship between the maximum correlation sub-regions in the second image.

15. The article of manufacture according to claim 14, wherein the program further comprises:

computer readable program code means for causing a computer to detect whether the searched maximum correlation regions are in a predetermined relationship to the second image; and computer readable program code means for causing a computer to re-define at least one of the rectangular sub-regions when it is detected that at least one of the maximum correlation regions is in the predetermined relationship to the second image.

16. The article of manufacture according to claim 15, wherein:

the computer readable program code means for causing a computer to detect includes computer readable program code means for causing a computer to detect whether any of the maximum correlation are displaced from the second image by an amount that is larger than a predetermined amount; and the computer readable program code means for causing a computer to re-define includes computer readable program code means for causing a computer to move at least one of the rectangular sub-regions in accordance with a detected displacement amount.

17. The article of manufacture according to claim 14, wherein the first image is a reference fingerprint image which is registered, and the second image is a fingerprint image which is to be collated with the reference fingerprint image.

18. The article of manufacture according to claim 14, wherein the computer readable program code means for causing a computer to search for a maximum correlation region comprises:

a computer readable program code means for causing a computer to set, in the second image, a corresponding region of the rectangular reference region; and computer readable program code means for causing a computer to calculate a correlation between the rectangular reference region and the corresponding region while moving the corresponding region.

* * * * *